US011660936B2

(12) United States Patent
Hattori

(10) Patent No.: US 11,660,936 B2
(45) Date of Patent: May 30, 2023

(54) WIND DIRECTION ADJUSTMENT DEVICE

(71) Applicant: NIHON PLAST CO., LTD., Fujinomiya (JP)

(72) Inventor: Akio Hattori, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 118 days.

(21) Appl. No.: 17/083,468

(22) Filed: Oct. 29, 2020

(65) Prior Publication Data
US 2021/0129631 A1    May 6, 2021

(30) Foreign Application Priority Data

Oct. 30, 2019  (JP) .............................. JP2019-197715

(51) Int. Cl.
 *B60H 1/34*    (2006.01)
(52) U.S. Cl.
 CPC ... *B60H 1/3421* (2013.01); *B60H 2001/3478* (2013.01)
(58) Field of Classification Search
 CPC ................ B60H 1/3421; B60H 1/3414; B60H 2001/3478
 USPC ......................................................... 454/155
 See application file for complete search history.

(56) References Cited

U.S. PATENT DOCUMENTS

| | | | | |
|---|---|---|---|---|
| 3,802,328 A * | 4/1974 | Kakizaki | ................ | F24F 13/065 454/154 |
| 6,780,098 B2 * | 8/2004 | Nishida | ................ | B60H 1/3414 454/155 |
| 9,975,397 B2 * | 5/2018 | Terai | .................. | B60H 1/00678 |
| 2004/0219874 A1 * | 11/2004 | Karadia | ............... | B60H 1/3421 454/155 |
| 2010/0130115 A1 * | 5/2010 | Miki | ........................ | B60H 1/34 454/155 |
| 2010/0144263 A1 * | 6/2010 | Han | .................. | B60H 1/00678 454/155 |
| 2017/0057328 A1 | 3/2017 | Sano | | |
| 2017/0259649 A1 * | 9/2017 | Shibata | ................ | B60H 1/3421 |

FOREIGN PATENT DOCUMENTS

JP   2017-043172    3/2017

* cited by examiner

*Primary Examiner* — Avinash A Savani
*Assistant Examiner* — Dana K Tighe
(74) *Attorney, Agent, or Firm* — Amin, Turocy & Watson, LLP

(57) ABSTRACT

Wind direction adjustment device (10) includes cylindrical case body (11) having flow path (22) therein, and valve (14) that is movably disposed in case body (11) and that opens and closes flow path (22). Valve (14) includes base material (61) supported by case body (11). Valve (14) is formed of a member that is softer than base material (61), and includes soft portion (62) capable of elastically contacting case body (11) in a state in which flow path (22) is closed by valve (14). Valve 14 includes deformation suppressing portions (63) that suppresses deformation of soft portion (62) caused by contact of soft portion (62) with case body (11). Deformation suppressing portions (63) are disposed at positions at which deformation suppressing portions (63) are not in contact with case body (11) in a state in which flow path (22) is closed by valve (14).

3 Claims, 2 Drawing Sheets

WIND DIRECTION ADJUSTMENT DEVICE

CROSS REFERENCE TO RELATED APPLICATIONS

This application is entitled to the benefit of Japanese Patent Application No. 2019-197715, filed on Oct. 30, 2019, the disclosure of which including the specification, drawings and abstract is incorporated herein by reference in its entirety.

TECHNICAL FIELD

The present invention relates to a wind direction adjustment device provided with a shielding body that opens and closes a flow path inside a case body.

BACKGROUND ART

In the related art, in an air conditioning apparatus used in a vehicle such as an automobile, a wind direction adjustment device provided with an outlet which blows out wind is also referred to as an air conditioning blowing device, an air outlet, a ventilator, a register, or the like, is installed in various parts of a vehicle such as the instrument panel or the center console section, for example, and the wind direction adjustment device contributes to an improvement in comfort performance through heating and cooling.

As such a wind direction adjustment device, for example, there is known a wind direction adjustment device in which a cylindrical movable louver including a manipulation knob and a valve that is two hemispherical shielding bodies having distal end portions configured by soft portions are provided in a flow path inside a case body formed in a cylindrical shape, the wind direction is adjusted by tilt manipulation of the movable louver in an arbitrary direction in a state in which the flow path is opened by the valve, and the wind is blocked by a state in which the flow path is closed by the valve (for example, refer to PTL 1).

CITATION LIST

Patent Literature

PTL 1
Japanese Patent Application Laid-Open No. 2017-43172 (Pages 4 to 8, FIG. 1)

SUMMARY OF INVENTION

Technical Problem

Since the components of the wind direction adjustment device have minute variations, sometimes assembling the components results in the valve more strongly interfering with the case body than expected in the state in which the flow path is closed by the valve. In this case, the soft portions at the distal ends of the valve are greatly deformed by the interference with the case body, and when the soft portions are held in a state of intruding on (biting into) the closing direction side of the valve, even if an attempt is made to pivot the manipulation knob to the opening direction side in order to open the valve, problems may arise such as becoming unable to easily move the manipulation knob, which may impair the stability of quality.

The present invention is made in light of these points and an object thereof is to provide a wind direction adjustment device capable of stably operating the shielding body.

Solution to Problem

A wind direction adjustment device according to claim 1 includes a cylindrical case body having a flow path therein, and a shielding body that is movably disposed in the case body and that opens and closes the flow path, in which the shielding body includes a base material supported by the case body, a soft portion formed of a member softer than the base material and capable of elastically contacting the case body in a state in which the flow path is closed by the shielding body, and a deformation suppressing portion that suppresses deformation of the soft portion caused by contact with the case body, and the deformation suppressing portion is disposed at a position at which the deformation suppressing portion does not come in contact with the case body in a state in which the flow path is closed by the shielding body.

In accordance with the wind direction adjustment device according to claim 2, in the wind direction adjustment device according to claim 1, the shielding body includes a step portion that is recessed in a direction away from the case body at a position facing the case body in a state in which the flow path is closed, and the deformation suppressing portion is a protrusion portion disposed on the step portion.

In accordance with the wind direction adjustment device according to claim 3, in the wind direction adjustment device according to claim 2, the deformation suppressing portion has a height substantially equal to a depth of the step portion.

In accordance with the wind direction adjustment device according to claim 4, in the wind direction adjustment device according to claim 2, a plurality of the deformation suppressing portions is disposed at intervals.

Advantageous Effects of Invention

According to the wind direction adjustment device of claim 1, even if the soft portion interferes with the case body more strongly than expected, the soft portion is excessively deformed and bites into the case body, or the deformation suppressing portion itself bites into the case body and it is possible to suppress the shielding body from locking, so it is possible to stably operate the shielding body.

According to the wind direction adjustment device of claim 2, in addition to the effect of the wind direction adjustment device of claim 1, it is possible to prevent the deformation suppressing portion from excessively protruding, and it is possible to ensure that deformation suppressing portions do not easily cause air resistance and do not easily influence the wind direction in the state in which the shielding body opens the flow path.

According to the wind direction adjustment device of claim 3, in addition to the effect of the wind direction adjustment device of claim 2, it is possible to ensure that deformation suppressing portions do not easily cause air resistance and do not easily influence the wind direction in the state in which the shielding body opens the flow path.

According to the wind direction adjustment device of claim 4, in addition to the effect of the wind direction adjustment device of claim 2 or 3, it is possible to suppress the formation of sink marks during the forming of the deformation suppressing portion, and it is possible to reliably mold the deformation suppressing portion into a desired shape.

DESCRIPTION OF EMBODIMENTS

Hereinafter, an embodiment of the present invention will be described with reference to the drawings.

Figure 1A:
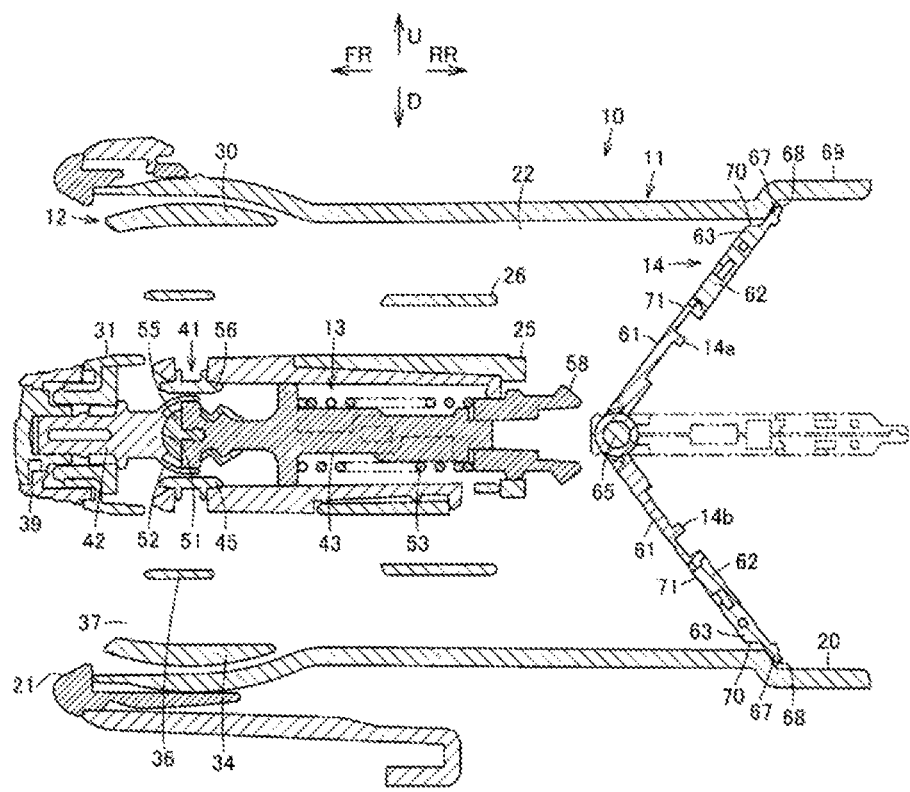
FIG. 1A is an end view illustrating a wind direction adjustment device according to an embodiment of the present invention.
Figure 3:
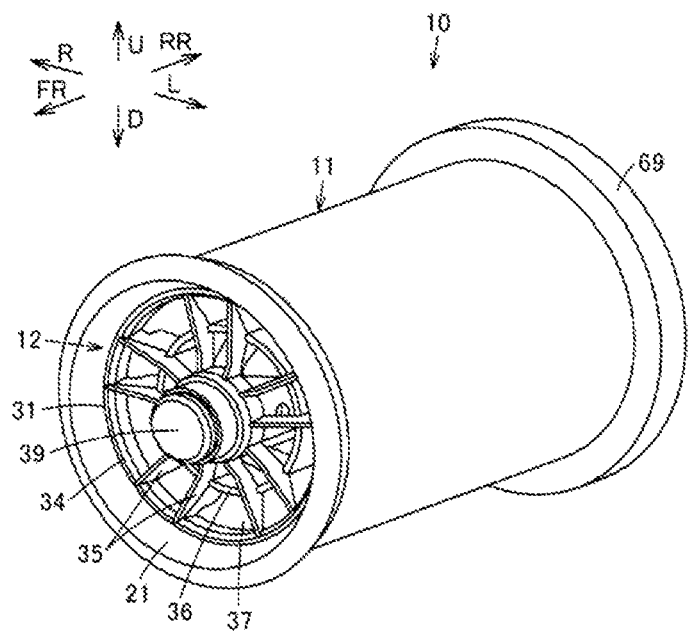
FIG. 3 is a perspective view of the wind direction adjustment device.

In FIGS. 1A and 3, 10 indicates a wind direction adjustment device. Wind direction adjustment device 10 is for air conditioning in which the direction of the wind, that is, the wind direction from an air conditioning apparatus or the like provided in a vehicle such as an automobile is adjusted, for example. Although not illustrated, wind direction adjustment device 10 is installed on an interior member of the automobile, for example, an installation target portion of an installment panel, a center console, an overhead console portion, a center pillar, a door trim, or the like. In the present embodiment, wind direction adjustment device 10 is set to be round.

Wind direction adjustment device 10 is referred to as an air outlet, a ventilator, a register, or the like, and is provided with case body 11, movable louver 12, support section 13 which supports movable louver 12 to be capable of pivoting in all directions inside case body 11, and valve 14 serving as a shielding body (a valve body).

Case body 11 includes circular receiving port 20 which is an inlet which receives the wind from the air conditioning apparatus or the like, for example, on one end side and includes circular exhaust port 21 which communicates with receiving port 20 and blows out wind. Flow path 22 which causes receiving port 20 and exhaust port 21 to communicate and allows the wind to pass therethrough is formed inside case body 11. In other words, receiving port 20 is positioned at the upstream end of flow path 22, and exhaust port 21 is positioned at the downstream end of flow path 22. Shaft bearing section 25 is provided along the center axis of case body 11 inside (flow path 22 of) case body 11. Rectifying section 26 is provided inside (flow path 22 of) case body 11. Hereinafter, a downstream side of the wind passing from receiving port 20 side toward exhaust port 21 side through flow path 22 inside case body 11 is a front side (arrow FR side), an upstream side is a rear side (arrow RR side), horizontal directions or width directions orthogonally intersecting the front and rear directions (arrows FR and RR directions) are left/right directions (arrows L and R directions) as viewed from the front side, directions orthogonally intersecting the front/rear directions and the left/right directions are up/down directions (arrows U and D directions), and a description will be given with this premise. A circumferential direction may also refer to a direction along an arc centered on a center axis on a plane orthogonally intersecting the center axis of case body 11.

Shaft bearing section 25 is a portion holding support section 13 and supporting movable louver 12 to be capable of pivoting. Shaft bearing section 25 is provided at a position on the center axis of case body 11 to be longitudinal and cylindrical along the front/rear directions which are the axial directions of case body 11.

Rectifying section 26 rectifies the wind passing through flow path 22. Rectifying section 26 is provided to be cylindrical and coaxial with case body 11 and shaft bearing section 25 in the vicinity of shaft bearing section 25, for example. That is, rectifying section 26 is provided to be longitudinal and cylindrical along the front/rear directions. Rectifying section 26 is not a mandatory configuration.

Movable louver 12 is also referred to as a bladed body, a housing, or fins and controls the wind direction blown out from wind direction adjustment device 10. Movable louver 12 is provided with louver main body section 30 and louver shaft bearing section 31.

Louver main body section 30 is formed using a synthetic resin or the like which has rigidity, for example. Louver main body section 30 includes cylindrical contour portion 34 and a plurality of blades 35 radially formed to span the space between contour portion 34 and louver shaft bearing section 31. Blades 35 are joined to one another by cylindrical joining portion 36 disposed to be concentric with contour portion 34. A fan-shaped portion surrounded by contour portion 34, blades 35, and joining portion 36 forms ventilation port 37 which communicates with exhaust port 21 to allow a wind to pass therethrough.

Louver shaft bearing section 31 is formed in a cylindrical shape and is disposed to be concentric with contour portion 34. The rear portion of louver shaft bearing section 31 is connected to support section 13. Manipulation knob 39, which serves as a manipulation portion for manipulating movable louver 12 and valve 14 with respect to case body 11, is attached to the front portion of louver shaft bearing section 31. Manipulation knob 39 is joined to support section 13 inside louver shaft bearing section 31. Manipulation knob 39 is disposed coaxially with contour portion 34 on the center portion of movable louver 12.

Support section 13 is a portion which supports movable louver 12 inside case body 11 such that movable louver 12 is capable of pivoting. Support section 13 sets the pivoting load (the torque) of movable louver 12 in relation to case body 11. Support section 13 is provided with joint portion 41, bearing portion 42 which serves as ball receiving portion which is a support section, and link 43 which serves as pivoting base portion which is another support section.

Joint portion 41 supports movable louver 12 to be capable of pivoting in relation to case body 11. Joint portion 41 is a universal joint in the present embodiment. In other words, joint portion 41 is provided with one shaft support body 45 which is supported on the case body 11 side and another shaft support body (not illustrated) which is supported on the movable louver 12 side, and the one shaft support body 45 and the other shaft support body are joined to be capable of pivoting in direction orthogonally intersecting each other.

The one shaft support body 45 of the present embodiment is supported by shaft bearing section 25 of case body 11 to be capable of pivoting in the left/right directions. In the one shaft support body 45, positions on opposite sides from each other interposing a center axis and orthogonally intersecting an axial line of the pivoting shaft, in the present embodiment, positions on the left and right are supported to be capable of pivoting around the other shaft support body, and the other shaft support body is capable of pivoting with respect to the one shaft support body 45 in a direction orthogonally intersecting the pivoting direction of the one shaft support body 45 with respect to case body 11. The other shaft support body is fixed to the rear portion of louver shaft bearing section 31 of movable louver 12. Therefore, due to the one shaft support body 45 pivoting around case body 11, movable louver 12 pivots around case body 11 integrally with the other shaft support body, and due to the other shaft support body pivoting around the one shaft support body 45, movable louver 12 pivots around case body 11 integrally with the other shaft support body.

Bearing portion 42 is maintained on the movable louver 12 side. The front side of bearing portion 42 is inserted through the other shaft support body of joint portion 41 and is integrally joined to manipulation knob 39 in louver shaft bearing section 31 of movable louver 12. Therefore, bearing portion 42 is capable of pivoting in the circumferential direction around movable louver 12 through the pivoting manipulation of manipulation knob 39. The rear side of bearing portion 42 facing link 43 is positioned inside joint portion 41. Bearing portion 42 is provided with spherical surface portion 51 and protruding portion 52 on rear side of bearing portion 42 facing link 43. Spherical surface portion 51 is one sliding portion and protruding portion 52 serves as one abutting portion which is one restricting portion. Spherical surface portion 51 is provided to be recessed in a hemispherical surface shape. Protruding portion 52 is formed in a hemispherical surface shape surrounding the outside of spherical surface portion 51 and the distal end portion extends from a position on the outside in the radial direction with respect to spherical surface portion 51 toward the rear side.

Link 43 is maintained on the case body 11 side. Link 43 is formed in a shaft shape and is disposed to be capable of moving along an axial direction inside shaft bearing section 25. Link 43 is biased toward the front side which is the movable louver 12 side (the bearing portion 42 side) by coil spring 53 which serves as a biasing section. The front end portion of link 43 is provided with ball portion 55 and stopper portion 56. Ball portion 55 is another sliding portion which slides against spherical surface portion 51 of bearing portion 42 and stopper portion 56 serves as another abutting portion which is another restricting portion that sets a pivoting end of movable louver 12 by abutting against protruding portion 52. Ball portion 55 and stopper portion 56 are integrally formed of, for example, a soft synthetic resin.

Gear section 58 which causes valve 14 to operate is joined to link 43. Gear section 58 meshes with gear 59 (FIG. 2) of valve 14 and causes valve 14 to perform opening/closing operations by pivoting in the circumferential direction around case body 11.

Figure 2:
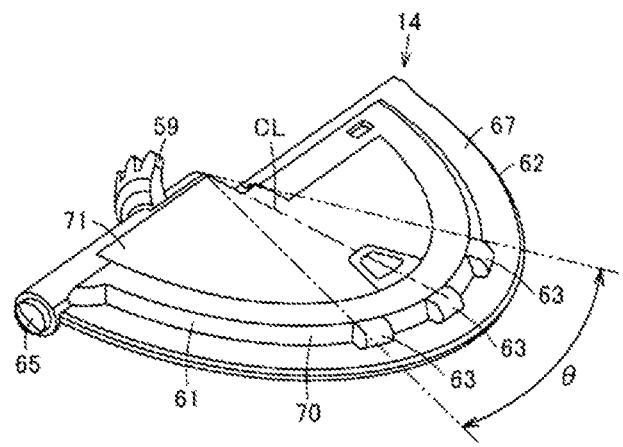
FIG. 2 is a perspective view illustrating a portion of a shielding body of the wind direction adjustment device.

Valve 14 controls the wind amount to be blown out from wind direction adjustment device 10 by controlling the opening/closing amount of flow path 22. Valve 14 is positioned inside flow path 22 behind shaft bearing section 25 and is movably attached to case body 11. In other words, valve 14 is positioned inside case body 11 (flow path 22) on the rear side, which is the upstream side with respect to movable louver 12 and support section 13. In the present embodiment, valve 14 is attached to case body 11 to be capable of pivoting. As illustrated in FIGS. 1A and 2, valve 14 is provided with a hard base material 61 supported by case body 11 and soft portion 62 formed of a member softer than base material 61. Furthermore, valve 14 is provided with deformation suppressing portions 63 that suppress the deformation of soft portion 62. The number of valves 14 may be set to an arbitrary number as long as it is possible to open and close flow path 22 and may have an arbitrary shape corresponding to flow path 22. However, in the present embodiment, this is set to a pair (one valve 14*a* and other valve 14*b*) and valve 14 is formed in a hemispherical shape capable of closing half of flow path 22 of case body 11. One valve 14*a* and other valve 14*b* are configured such that their opening/closing operations mutually operate together. In other words, one valve 14*a* and other valve 14*b* are arranged symmetrically or substantially symmetrically to each other with respect to the center axis of case body 11, and each is configured to operate (pivot) symmetrically with respect to the center axis of case body 11. In other words, in the present embodiment, the pivoting directions of one valve 14*a* and other valve 14*b* are opposite to each other and when one pivots in the clockwise direction when viewed from the pivoting axial line direction, the other pivots counterclockwise. In the present embodiment, one valve 14*a* and other valve 14*b* are disposed to be vertically symmetrical.

Base material 61 is formed using a rigid synthetic resin such as PP or ABS. In the present embodiment, base material 61 is formed in a hemispherical plate shape. Base material 61 configures a portion of valve 14 (valves 14*a* and 14*b*) supported by case body 11. Base material 61 integrally includes shaft portion 65. Shaft portion 65 is formed along the diameter portion of the shape of base material 61. In the present embodiment, shaft portion 65 is formed to be a portion corresponding to the radius of the shape of base material 61, one valve 14*a* and other valve 14*b* are coaxially combined to form a diameter portion of the shape of base material 61, and shaft portion 65 forms a single shaft portion that crosses flow path 22. Shaft portion 65 is supported to be capable of pivoting in a shaft hole (not illustrated) formed in case body 11. Shaft portion 65 is disposed along a direction intersecting or orthogonally intersecting the center axis of case body 11. In the present embodiment, shaft portion 65 is positioned at the foremost portion of valve 14. In other words, valve 14 is supported by case body 11 at the foremost position and is disposed to extend rearward from the foremost position.

Figure 1B:
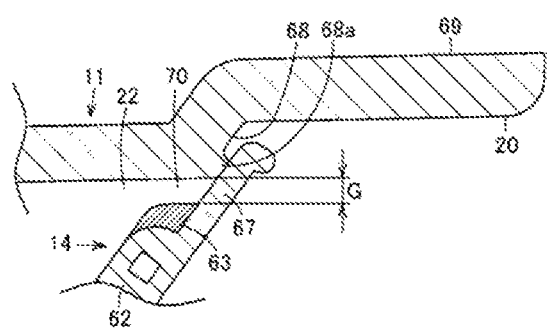
FIG. 1B is an end view in which a portion of FIG. 1A is enlarged.

Soft portion 62 is formed of a synthetic resin having a rigidity lower than that of base material 61, such as TPE or silicone rubber, for example. Soft portion 62 is a portion that capable of elastically contacting the inner wall of case body 11 in a state in which flow path 22 is closed by valve 14. Soft portion 62 is formed to cover the outer edge portion of base material 61 and configures the outer edge portion of valve 14. Soft portion 62 is formed in a belt shape that curves in an arc shape along the outer edge portion of base material 61 or valve 14. Soft portion 62 is formed flush or substantially flush with base material 61. In other words, no step is formed at the position of the joint between base material 61 and soft portion 62. Soft portion 62 is formed to be integral with base material 61 by, for example, two-color molding. Contact portion 67 capable of contacting case body 11 is formed on soft portion 62. Contact portion 67 is positioned on the outer edge portion of soft portion 62. Contact portion 67 is formed along the outer peripheral edge of valve 14 on soft portion 62. Contact portion 67 is capable of contacting valve bearing portion 68, which is the shielding body bearing portion formed on case body 11, in a closed state in which valve 14 closes flow path 22. Valve bearing portion 68 is formed in partition portion 69 that partitions receiving port 20. Partition portion 69 forms the upstream end, that is, the rear end of case body 11. In the present embodiment, valve bearing portion 68 is positioned at the downstream end, that is, the front end of partition portion 69. Valve bearing portion 68 is an inclined surface whose diameter gradually increases toward the rear side which is the upstream side. In other words, valve bearing portion 68 is positioned in the pivoting range of contact portion 67 of soft portion 62 when valve 14 pivots from the open state in which flow path 22 is opened to the closed state in which flow path 22 is closed, and valve bearing portion 68 is inclined along a direction parallel or substantially parallel to contact portion 67 pivoted to the closed state. As illustrated in FIG. 1B, valve bearing portion 68 may be provided with projecting portion 68a. Projecting portion 68a is a portion that directly contacts contact portion 67. Projecting portion 68a is disposed, for example, at the downstream end of valve bearing portion 68 and projects rearward from valve bearing portion 68.

Deformation suppressing portions 63 are portions that improve the rigidity of soft portion 62 and suppress the deformation caused by soft portion 62 making contact with case body 11. Deformation suppressing portions 63 are portions that suppress intrusion (biting) caused by deformation of soft portion 62 (contact portion 67) when soft portion 62 interferes with case body 11 more strongly than expected due to dimensional variation of each portion or the like, or when valve 14 is forcibly pushed in the closing direction by an external force. In the present embodiment, deformation suppressing portions 63 are formed to be integral with soft portion 62. Not limited thereto, deformation suppressing portions 63 may be formed on base material 61 illustrated in FIG. 2 and bonded to the thin soft portion 62.

In the present embodiment, deformation suppressing portions 63 are formed as protrusion portions or rib portions. Deformation suppressing portion 63 may be single or plural. One deformation suppressing portion 63 may be formed continuously in the circumferential direction of valve 14 or deformation suppressing portion 63 may be divided into a plurality of portions. In the present embodiment, a plurality of deformation suppressing portions 63 is formed and deformation suppressing portions 63 are disposed apart from each other. Deformation suppressing portions 63 are disposed uniformly or symmetrically with respect to center line CL orthogonally intersecting the axial direction of shaft portion 65 of valve 14. The range in which deformation suppressing portions 63 are formed is a range in which deformation suppressing portions 63 are formed on both sides in the circumferential direction by a predetermined angle when viewed from center line CL. In the present embodiment, deformation suppressing portions 63 are disposed at 27° on both sides in the circumferential direction with respect to center line CL, over 54°. In other words, disposition angle range θ of deformation suppressing portions 63 is 54°. Disposition angle range θ is set to a range apart from shaft portion 65. In other words, deformation suppressing portions 63 are arranged at positions apart from shaft portion 65. Therefore, in the present embodiment, valve 14 is set to have a non-disposition angle range in which deformation suppressing portions 63 are not disposed respectively from both sides of disposition angle range θ to shaft portion 65. The shape of deformation suppressing portion 63 in the present embodiment has, for example, a width of 5 mm and an interval of 4 mm, and one is disposed at a position intersecting center line CL, and one is arranged on each side thereof, totaling three. Not limited thereto, the width, the interval (the disposition angle range), and the number of deformation suppressing portions 63 may be arbitrarily set within a range where the effect may be obtained.

Furthermore, deformation suppressing portions 63 are disposed on step portion 70. Step portion 70 is a recessed portion that is recessed in the thickness direction of valve 14. In other words, step portion 70 is recessed in the direction away from the inner wall of case body 11 (FIG. 1A). Step portion 70 is formed in valve 14 at a position or surface facing the inner wall of case body 11 in a closed state in which flow path 22 is closed. For example, in the present embodiment, since the upper surface of one valve 14a faces the upper inner wall (valve bearing portion 68) of case body 11 in the closed state in which flow path 22 is closed, and the lower surface of other valve 14b faces the lower inner wall (valve bearing portion 68) of case body 11 in the closed state in flow path 22 is closed, step portion 70 and deformation suppressing portions 63 disposed on step portion 70 are on the upper surface in one valve 14a and on the lower surface on other valve 14b. Step portion 70 is formed along the outer edge portion of valve 14. In the present embodiment, step portion 70 is continuous in the circumferential direction over the entire outer edge portion of valve 14. Step portion 70 is positioned at the outermost edge of valve 14. As illustrated in FIGS. 1A and 1B, deformation suppressing portions 63 have a height substantially equal to the depth of step portion 70. Deformation suppressing portions 63 form a rectifying surface of valve 14, that is, are flush or substantially flush with general portion 71 that rectifies the wind that passes through flow path 22, and do not project in a step shape in the thickness direction with respect to general portion 71 of valve 14. In the present embodiment, although step portion 70 is formed on soft portion 62 and the thinned portion of step portion 70 is formed as contact portion 67, the embodiment is not limited thereto, and step portion 70 may be formed on base material 61 or may be formed over base material 61 and soft portion 62.

Deformation suppressing portions 63 are disposed at positions of the step surface of step portion 70, that is, the surface in which step portion 70 and general portion 71 of valve 14 are continuous. In other words, deformation suppressing portions 63 are at positions displaced toward the center side (the inside) with respect to the outer edge portion of valve 14. Therefore, deformation suppressing portions 63 are disposed at positions at which deformation suppressing portions 63 are not in contact with case body 11 in a state in which flow path 22 is closed by valve 14, that is, in a state in which contact portion 67 is in contact with valve bearing portion 68. In other words, deformation suppressing portions 63 are disposed at positions to include gap (clearance) G and face the front side, which is on the downstream side of case body 11, in the present embodiment, valve bearing portion 68 in a state in which flow path 22 is closed by valve 14. In addition, in order to clarify the explanation, in FIG. 1B, deformation suppressing portions 63 are depicted with hatching different from the periphery.

Wind direction adjustment device 10 which is installed on an installation target portion of an interior member of an automobile allows a wind which is received from receiving port 20 to pass through flow path 22 and the wind flows via exhaust port 21 from each ventilation port 37 of movable louver 12 toward the front direction of a passenger when movable louver 12 is positioned at a neutral position with valve 14 in an open state as illustrated by the double-dot line of FIG. 1A, that is, when case body 11 and movable louver 12 are substantially coaxial.

Movable louver 12 pivots due to pinching and up/down/left/right manipulating manipulation knob 39. At this time, movable louver 12 may pivot in an arbitrary direction around the center of ball portion 55 using two mutually and orthogonally intersecting axes as axial lines according to the structure of joint portion 41. The pivoting end of movable louver 12 is restricted by the abutting of protruding portion 52 against stopper portion 56. In a state in which movable louver 12 is pivoted in this manner, the center axis of movable louver 12 is parallel to a direction intersecting the center axis of case body 11 and the wind flows along the center axis of movable louver 12, via exhaust port 21, from each ventilation port 37, toward a direction inclined with respect to the front direction of the passenger.

When manipulation knob 39 is pinched and twisted in the circumferential direction with respect to movable louver 12, bearing portion 42 which operates together with manipulation knob 39 pivots in the circumferential direction. Since ball portion 55 of link 43 is pressed against bearing portion 42 by coil spring 53, link 43 pivots in the circumferential direction together with gear section 58, and valve 14 pivots as indicated by the solid line of FIG. 1A. In other words, valve 14 is subjected to a pivoting manipulation by manipulating manipulation knob 39. When contact portion 67 of valve 14 assumes a position at which contact portion 67 contacts valve bearing portion 68 of case body 11, flow path 22 is closed, and the wind stops blowing out from ventilation port 37 of movable louver 12, that is, exhaust port 21 of movable louver 12 (closed state).

At this time, in the present embodiment, since deformation suppressing portions 63 that suppress the deformation of soft portion 62 due to contact with case body 11 (valve bearing portion 68) are formed in valve 14 and deformation suppressing portions 63 do not contact case body 11 in the state in which flow path 22 is closed by valve 14, when manipulation knob 39 is normally operated, hypothetically, even if soft portion 62 more strongly interferes with valve bearing portion 68 of case body 11 than expected due to dimensional variation of each portion and the like, it is possible to suppress soft portion 62 being excessively deformed and biting into case body 11, deformation suppressing portions 63 themselves biting into case body 11, and valve 14 becoming locked. Therefore, it is possible to stably operate valve 14, and the manipulability is improved.

Hypothetically, even if valve 14 is forcibly pushed in the closing direction by an external force and soft portion 62 (contact portion 67) is deformed, deformation suppressing portions 63 abut against the inner wall of case body 11 and restrict any further deformation of soft portion 62 (contact portion 67) and deformation suppressing portions 63 push back soft portion 62 (contact portion 67), and so soft portion 62 is not easily excessively deformed and does not easily bite into case body 11.

Furthermore, by disposing deformation suppressing portions 63 as protrusion portions on step portion 70, it is possible to prevent deformation suppressing portions 63 from excessively projecting with respect to general portion 71, and it is possible to ensure that deformation suppressing portions 63 do not easily cause air resistance and do not easily influence the wind direction in the state in which valve 14 opens flow path 22.

Furthermore, by rendering the height of deformation suppressing portions 63 substantially the same as the depth of step portion 70, no step is formed between general portion 71 and deformation suppressing portions 63, and it is possible to ensure that deformation suppressing portions 63 do not easily cause air resistance and do not easily influence the wind direction in the state in which valve 14 opens flow path 22.

By disposing a plurality of deformation suppressing portions 63 with an interval therebetween, it is possible to suppress the formation of sink marks during the forming of deformation suppressing portions 63, and it is possible to reliably mold deformation suppressing portions 63 into a desired shape.

In the above-described embodiment, valve 14 may be formed in a single circular shape. In this case, shaft portion 65 is disposed along the diameter portion of valve 14, and valve 14 is supported by case body 11 so that one and the other pivot in the same direction with shaft portion 65 interposed therebetween. Therefore, deformation suppressing portions 63 and step portion 70 on one side and deformation suppressing portions 63 and step portion 70 on the other side interposing shaft portion 65 may each be disposed at a position facing the inner wall of case body 11, that is, at the outer edge portions of the main surfaces on opposite sides to each other in a state in which valve 14 closes flow path 22.

Although spherical surface portion 51 and protruding portion 52 are set to the movable louver 12 side and ball portion 55 and stopper portion 56 are set to the case body 11 side, a configuration may be adopted in which spherical surface portion 51 and protruding portion 52 are set to link 43 of the case body 11 side and ball portion 55 and stopper portion 56 are set to bearing portion 42 of the movable louver 12 side. Even in this case, it is possible to realize similar operations and effects to those of the embodiment.

Wind direction adjustment device 10 is not limited to being for vehicles and may be used in adjusting the wind direction of an arbitrary air conditioning apparatus or the like.

INDUSTRIAL APPLICABILITY

It is possible to favorably apply the present invention as a wind direction adjustment device for air conditioning of an automobile, for example.

REFERENCE SIGNS LIST

10 Wind direction adjustment device
11 Case body
14 Valve serving as shielding body
22 Flow path
61 Base material
62 Soft portion
63 Deformation suppressing portion
70 Step portion

What is claimed is:
1. A wind direction adjustment device comprising:
a cylindrical case body having a flow path therein; and
a shielding body that is movably disposed in the case body and that opens and closes the flow path, wherein the shielding body includes
a base material supported by the case body,
a soft portion formed of a member softer than the base material and capable of elastically contacting the case body in a state in which the flow path is closed by the shielding body, and
a deformation suppressing portion that suppresses deformation of the soft portion caused by contact with the case body, wherein
the shielding body includes a step portion that is recessed in a direction away from the case body at a position facing the case body in the state in which the flow path is closed,
the deformation suppressing portion is a protrusion portion or a rib portion disposed on the step portion, and
the step portion and the deformation suppressing portion are formed only at a surface of the shielding body facing an inner wall of the case body in the state in which the flow path is closed.
2. The wind direction adjustment device according to claim 1, wherein the deformation suppressing portion has a height substantially equal to a depth of the step portion.

3. The wind direction adjustment device according to claim 1, wherein
a plurality of the deformation suppressing portions is disposed at intervals.

\* \* \* \* \*